United States Patent
Moller et al.

(10) Patent No.: US 7,434,889 B2
(45) Date of Patent: Oct. 14, 2008

(54) SELF-PROPELLED CONCRETE SAW WITH FORWARD MOTION SPEED CONTROL SYSTEM

(75) Inventors: Karl H. Moller, North Palm Beach, FL (US); Brian S. Edwards, Amherst, OH (US)

(73) Assignee: Diamond Products, Limited, Elyria, OH (US)

(*) Notice: Subject to any disclaimer, the term of this patent is extended or adjusted under 35 U.S.C. 154(b) by 0 days.

(21) Appl. No.: 11/956,376

(22) Filed: Dec. 14, 2007

(65) Prior Publication Data

US 2008/0150347 A1 Jun. 26, 2008

Related U.S. Application Data

(63) Continuation of application No. 11/307,742, filed on Feb. 20, 2006, now abandoned.

(51) Int. Cl.
*B28D 1/02* (2006.01)
(52) U.S. Cl. ............................ 299/1.5; 299/39.3
(58) Field of Classification Search ............... 299/1.5, 299/1.05, 39.3
See application file for complete search history.

(56) References Cited

U.S. PATENT DOCUMENTS

| | | | |
|---|---|---|---|
| 4,343,513 A | 8/1982 | Godbersen | |
| 4,614,305 A | 9/1986 | Fekete et al. | |
| 4,848,845 A | 7/1989 | Kennedy | |
| 5,810,448 A | 9/1998 | Kingsley et al. | |
| 6,186,248 B1 | 2/2001 | Silay et al. | |
| 6,921,230 B2 | 7/2005 | Silay | |
| 2004/0120766 A1* | 6/2004 | Silay | 404/84.1 |
| 2004/0251730 A1* | 12/2004 | Steffen et al. | 299/1.05 |
| 2006/0000464 A1 | 1/2006 | Marques et al. | |

* cited by examiner

*Primary Examiner*—John Kreck
(74) *Attorney, Agent, or Firm*—Rankin, Hill & Clark LLP

(57) ABSTRACT

The present invention provides a forward motion speed control system for a self-propelled concrete saw, a self-propelled concrete saw equipped with a forward motion speed control system and a method of controlling the forward motion speed of a concrete saw during a cutting or scoring operation. In one preferred embodiment of the invention, the forward motion speed control system senses and monitors the speed of a power plant transmitting rotational energy to a saw blade and adjusts the forward motion speed of the self-propelled concrete saw to maximize the forward motion speed of the self-propelled concrete saw while maintaining the speed of the power plant in a peak operational range.

7 Claims, 3 Drawing Sheets

SELF-PROPELLED CONCRETE SAW WITH FORWARD MOTION SPEED CONTROL SYSTEM

This application is a continuation of application Ser. No. 11/307,742 filed Feb. 20, 2006 which is incorporated by reference herein in its entirety.

BACKGROUND OF THE INVENTION

1. Field of Invention

The present invention relates to a saw for cutting concrete, asphalt, and other hard, flat surfaces and, more particularly, to a self-propelled concrete saw equipped with a forward motion speed control system.

2. Description of Related Art

Large, horizontal slabs of concrete are frequently poured during the construction of buildings, bridges, roads, runways and the like. Once poured, such slabs must often be cut or scored using a concrete saw for various reasons such as, for example, to form expansion joints, to allow for foundation shifting, to create stress cracks along which the slab will split and/or to create high friction surfaces such as for bridge decks and airport runways. In most large-scale applications, a self-propelled concrete saw is used to cut or score the slab. Self-propelled concrete saws are also used to cut or score asphalt, stone and other hard surfaces.

Most self-propelled concrete saws are equipped with a power plant (e.g., an internal combustion engine or electric motor) and a drive system that is configured to rotate a diamond impregnated saw blade during the cutting and/or scoring operation. The power plant is usually configured to produce maximum horsepower in a peak operational range, which is usually expressed in terms of a range of revolutions per minute ("RPM"). In this peak operational range, the power plant can generate maximum torque, and thus the work the saw blade can accomplish is also maximized. Internal combustion engines, in particular, are usually designed to provide maximum engine cooling in this peak operational range.

Diamond impregnated saw blades are extremely durable, but they do wear out over time. Studies have shown that the service life of a diamond impregnated saw blade is maximized when the blade is rotated at a rate within a specified range of optimal angular velocities and when the torque loading on the blade is held within a specified range. Excessive angular velocities or torque loadings can result in premature wearing, while insufficient angular velocities or torque loadings can cause the cutting surfaces of the saw blade to become polished, which severely diminishes the cutting efficiency of the saw blade.

Generally speaking, torque loading on a saw blade mounted on a self-propelled concrete saw is a function of the depth of cut, the rotational energy being transmitted to the saw blade by the power plant, and the forward motion speed of the concrete saw. The depth of the cut is usually application specific, and thus cannot be varied to optimize the speed of the cutting or scoring operation and/or the service life of the saw blade. The power plant is configured to operate in a peak range or band of optimal RPM's, and thus it is generally not advantageous to attempt to adjust the rotational speed of the power plant to optimize the speed of the cutting or scoring operation and/or the service life of the saw blade.

In most conventional self-propelled concrete saws, the forward motion speed of the concrete saw is set at a constant predetermined speed, or is manually controlled by the operator of the concrete saw, who walks behind the saw making adjustments in response to perceived changes in the performance of the concrete saw. In either instance, an operator must manually select and control the forward motion speed of the self-propelled concrete saw in response to perceived torque loading on the saw blade in order to attempt to maintain the angular velocity of the blade and the torque loading on the blade within their optimal ranges. This requires a high level of operator skill and creates a risk that the operator will select a forward travel speed that will damage the blades.

SUMMARY OF THE INVENTION

The present invention provides a forward motion speed control system for a self-propelled concrete saw, a self-propelled concrete saw equipped with a forward motion speed control system and a method of controlling the forward motion speed of a concrete saw during a cutting or scoring operation. In one preferred embodiment of the invention, the forward motion speed control system senses and monitors the rotational speed of the saw blade and/or speed of a power plant transmitting rotational energy to a saw blade and adjusts the forward motion speed of the self-propelled concrete saw to maximize the forward motion speed of the self-propelled concrete saw while maintaining the rotational speed of the saw blade and/or the power plant in a peak operational range.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
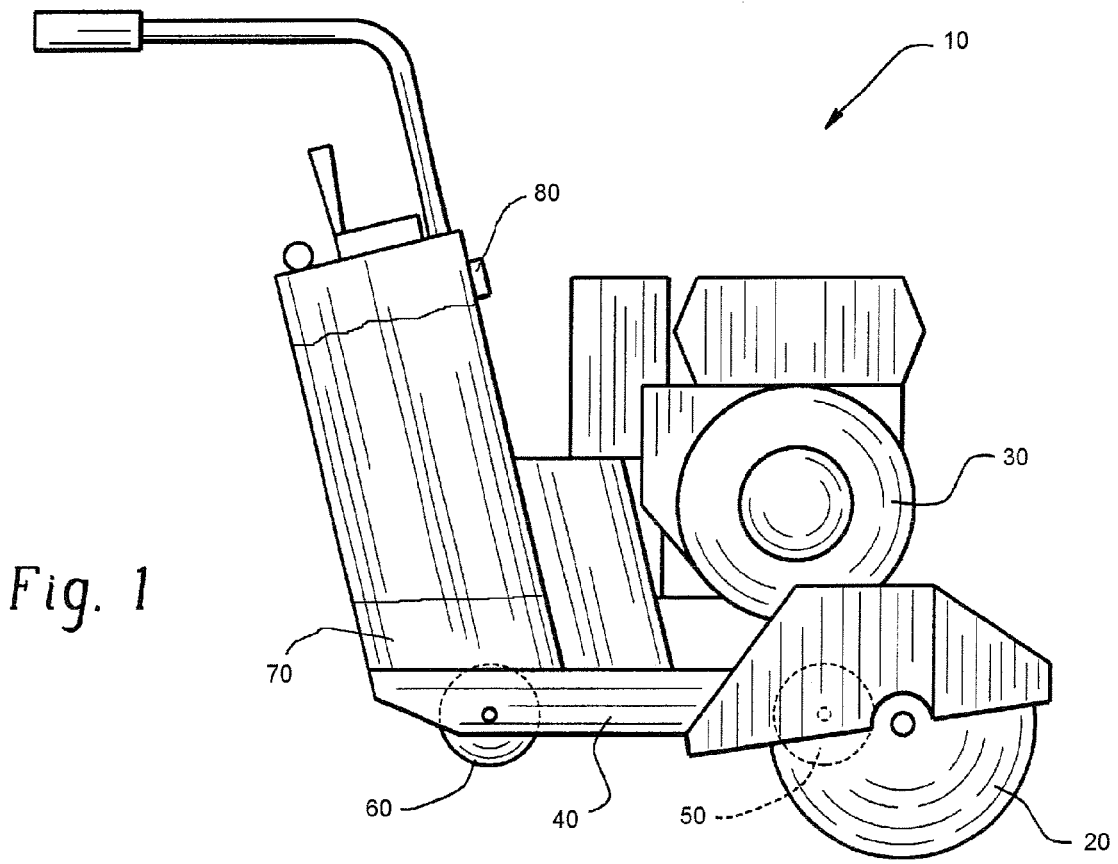
FIG. 1 is a schematic side view of a self-propelled concrete saw according to the invention.
Figure 2:
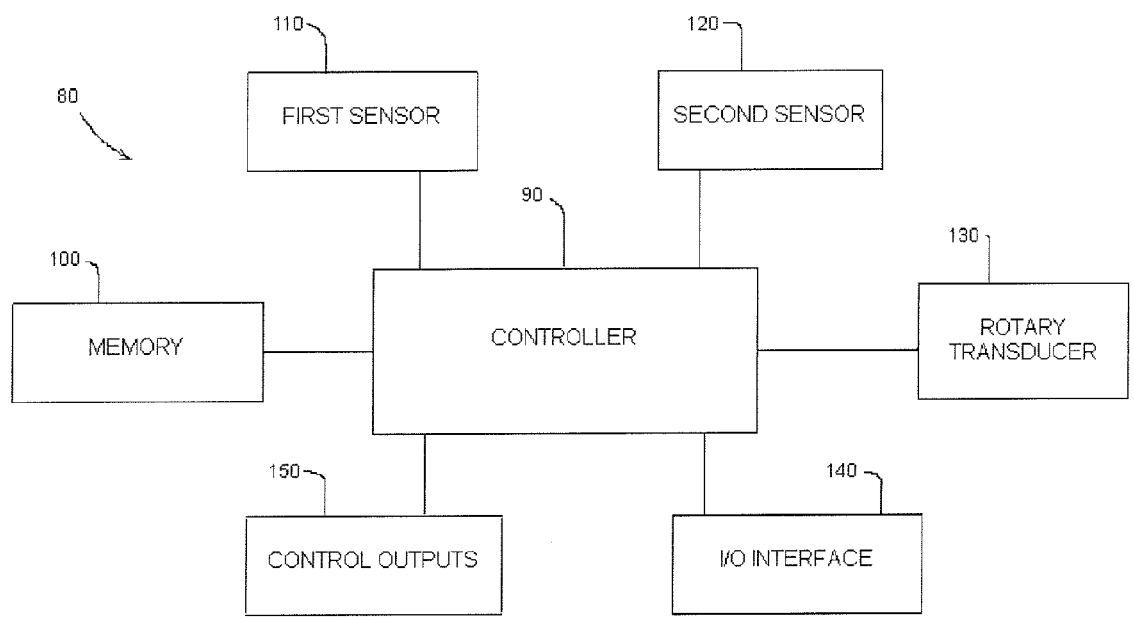
FIG. 2 is a block diagram of a control system according to one embodiment of the invention.

With reference to FIG. 1, a self-propelled concrete saw 10 comprises a diamond impregnated saw blade 20, a power plant (illustrated as an internal combustion engine) 30 and an associated drive system for providing rotational energy to the saw blade 20, a frame 40 for supporting the power plant 30, and a set of front wheels 50 and rear wheels 60 connected to the frame. In the schematically illustrated self-propelled concrete saw 10, the rear wheels 60 are driven in a conventional manner using a prime mover 70, typically a hydraulic drive system such as that shown in U.S. Pat. No. 5,810,448 which is incorporated herein by reference in its entirety. The forward motion speed of the self-propelled concrete saw 10 during a cutting or scoring operation is controlled by a control system 80. It will be appreciated that power plant 30 may comprise any one of a variety of power sources other than an internal combustion motor, such as, for example, a diesel motor or an electric motor.

In operation, the saw blade 20 preferably rotates in a direction that is the same as the rotation of the front wheels 50 as the self-propelled concrete saw 10 moves in a forward direction. The saw blade 20 thus naturally attempts to "climb out" of the cut as the cutting or scoring operation proceeds. This climbing out can be discernible as a decrease in the load on the saw blade 20, which will cause the RPM's of the internal combustion engine 30 to increase.

It will be appreciated that the saw blade 20 can alternatively be rotated in a direction opposite that of the rotation of the front wheels 50 as the self-propelled concrete saw 10 moves in a forward direction. This is disadvantageous in some applications, however, as it can result in chipping of the surface of the concrete being cut or scored adjacent to the cut.

As noted, the self-propelled concrete saw 10 schematically illustrated in FIG. 1 is equipped with a control system 80 in accordance with the invention. The control system 80 generates an output signal to the prime mover 70 to control the forward motion speed of the self-propelled concrete saw 10 in response to a first operational parameter that correlates to the rotational speed of the saw blade 20 during the cutting or scoring operation.

The control system 80 includes a controller 90 and a memory device 100 for storing both data and software used in conjunction with the controller 90. The control system 80 further comprises a first sensor 110 that measures a first operational parameter of the self-propelled concrete saw 10, and then provides a first output signal representative of a rotational speed value for the saw blade 20 to the controller 90. Because the rotational speed (usually measured in terms of RPM's) of the power plant 30 providing rotational energy to saw blade 20 generally correlates to the rotational speed of the saw blade 20, the first sensor 110 is preferably an electronic load control module or a tachometer mounted on the internal combustion engine 30. Alternatively, the first sensor 110 can be a digital RPM sensor for measuring the actual rotational speed of the saw blade 20.

Preferably, the controller 90 also receives input from a second sensor 120 that measures a second operational parameter of the self-propelled concrete saw 10 that correlates to the cutting depth of the saw blade 20. Data can also be provided to the controller 90 by a rotary transducer 130 mounted on one of the front wheels 50 of the self-propelled concrete saw. The output of the rotary transducer 130 can be used to determine the actual forward motion speed of the self-propelled concrete saw during the cutting or scoring operation.

The controller 90 can also include a user input/output ("I/O") interface 140 combining an interface such as a display screen with user controls such as an alphanumeric keyboard or keypad that can be manipulated by the user. The I/O interface enables input of operational data for use by the controller 90.

A number of mechanisms can be used to set or alter the forward motion speed of the self-propelled concrete saw 10. In one embodiment, the rear wheels 60 of the self-propelled concrete saw 10 are driven by a prime mover 70, which preferably comprises a hydraulic motor. The hydraulic flow can be altered using a swash plate, which is controllable via an electric signal. The magnitude of the flow generated by the swash plate determines the speed at which the self-propelled concrete saw 10 moves in a forward direction. Therefore, the controller 90 can control the forward motion speed of the self-propelled concrete saw 10 by providing a first controller output signal 150 to the prime mover 70 to ensure the swash plate provides the required hydraulic flow.

The control system 80 according to the invention can be configured with the objective of maximizing the rate at which the self-propelled concrete saw 10 is propelled in a forward motion as the saw blade cuts or scores a slab of concrete or other hard surface without exceeding the load limits on the saw blade. In doing so, the controller 90 can use the I/O interface 140 to prompt the operator for control parameters. For example, the control system 80 can prompt the operator to enter a maximum allowable forward travel speed for the particular cutting or scoring operation, maximum and minimum rotational speed values for the particular saw blade, and the depth of the cut. The maximum allowable forward travel speed is typically chosen in view of operator safety. Maximum and minimum rotational speed values are chosen to ensure that the saw blade does not wear too rapidly or become polished. The depth of the cut is typically determined in view of the particular cutting or scoring operation. The operator's input in response to prompts can be provided to the controller 90 through the I/O interface 140. Alternatively, the controller 90 can be pre-programmed with default values. The values entered by the operator, or the default values, are then used by the controller 90 to control the forward motion speed of the self-propelled concrete saw 10 in response to signals received from the first sensor 110 sensor and, optionally, from the second sensor 120 and the rotary transducer 130.

Figure 3:
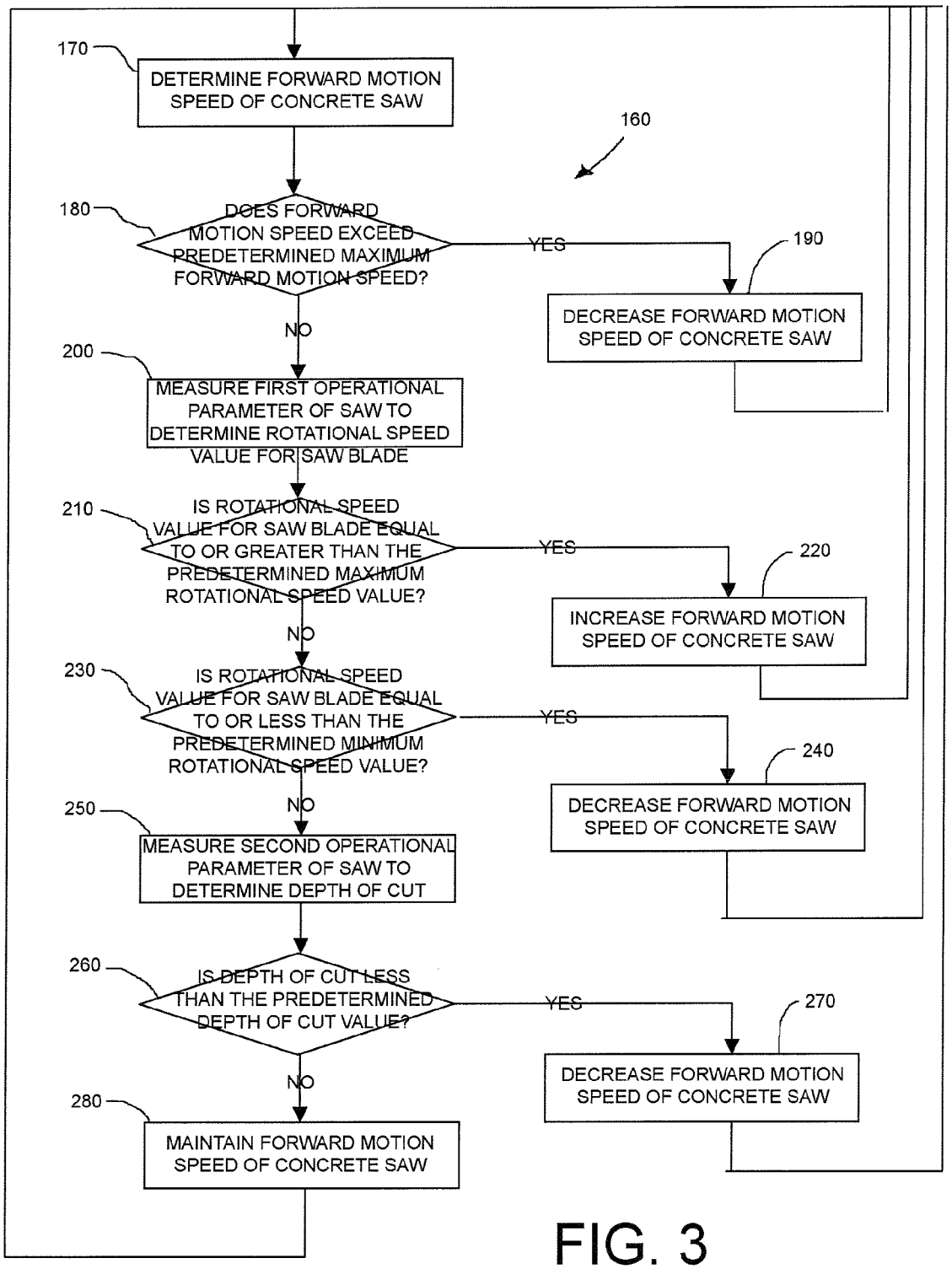
FIG. 3 is a flow chart illustrating a method of the invention for controlling the forward motion speed of a concrete saw during a cutting or scoring operation.

A flowchart illustrating a process for generating control signals in response to inputs from a first sensor 110 (e.g., an electronic control module, tachometer or digital RPM sensor), a second sensor 120 (e.g., cutting depth gauge) and a rotary transducer 130 in accordance with the present invention is illustrated in FIG. 3. The process 160 is a closed-loop process that operates continuously during the cutting or scoring operation. The process 160 comprises determining (170) the forward motion speed of the self-propelled concrete saw using inputs received from the rotary transducer 130. Once the forward motion speed is determined, it is compared (180) to a predetermined maximum allowable forward motion speed (e.g., entered by the operator or set as a default). If the forward motion speed of the self-propelled concrete saw 10 exceeds the predetermined maximum allowable speed, then the controller 90 sends an output signal 150 to the prime mover 70 to reduce (190) the forward motion speed of the self-propelled concrete saw 10.

If the forward motion speed of the self-propelled concrete saw 10 is determined to be below the predetermined maximum allowable speed, then a first operational parameter of the concrete saw that correlates to the rotational speed of the saw blade is measured (200) by a first sensor 110, which transmits a first output signal to the controller 90 representative of a rotational speed value for the saw blade 20. The controller 90 compares (210) the rotational speed value received from the first controller 110 with the predetermined maximum rotational speed value. If the rotational speed value for the saw blade is greater than or equal to the predetermined maximum rotational speed value, the controller 90 sends an output signal 150 to the prime mover 70 to increase (220) the forward motion speed of the self-propelled concrete saw 10.

If the rotational speed value for the saw blade does not exceed the predetermined maximum rotational speed value, the controller 90 compares (230) the rotational speed value for the saw blade received from the first controller 110 with the predetermined minimum rotational speed value. If the rotational speed value for the saw blade is less than or equal to a predetermined minimum rotational speed value, the controller 90 sends an output signal 150 to the prime mover 70 to decrease (240) the forward motion speed of the self-propelled concrete saw 10.

If the rotational speed value for the saw blade does not exceed the predetermined maximum rotational speed value and is not below the predetermined minimum rotational speed value, the depth of the cut is measured (250) by the second sensor 120, which transmits a second sensor output signal to the controller 90 representative of the depth of the cut. If the depth of the cut is less than a predetermined cutting depth, the controller 90 sends an output signal 150 to the prime mover decrease (270) the forward motion speed of the self-propelled concrete saw 10. If the depth of the cut is not less than the predetermined cutting depth, the controller 90 sends an output signal 150 to the prime mover to maintain (280) the forward motion speed of the self-propelled concrete saw 10.

It will be appreciated that the operator of the self-propelled concrete saw 10 can manually override the output signal 150 produced by the controller 90 in response to conditions perceived by the operator (e.g., the end point for cutting or safety concerns). Furthermore, the operator can make changes to the predetermined values used in the process 160 as needed, such as after a different size or configuration of saw blade 20 has been installed on the self-propelled concrete saw 10.

The control system 80 in accordance with the present invention causes a self-propelled concrete saw 10 to operate at the safest maximum forward motion speed to maximize the cutting efficiency and speed of the saw blade without overloading the saw blade or the plant driving the saw blade. The control system 80 reduces the likelihood that operator error will damage the saw blade or the power plant driving the saw blade. The saw monitors whether the saw blade has "climbed out" of the cut (i.e., the cutting depth is less than desired) or whether the load on the saw blade has become too excessive (i.e., the power plant RPM's fall below a predetermined minimum power band), and makes adjustments to the forward motion speed of the concrete saw to compensate for such changes. The control system 80 thus maximizes the speed at which a slab of concrete or other hard surface can be cut while at the same time protecting the saw blade from excessive wear.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general invention concept as defined by the appended claims and their equivalents.

What is claimed is:

1. A self-propelled concrete saw comprising:
   a frame supported by a set of front wheels and a set of rear wheels;
   a prime mover supported by the frame, the prime mover comprising a hydraulic motor that is adapted to drive the set of rear wheels and thereby propel the concrete saw in a forward direction during a cutting or scoring operation at a forward motion speed;
   a power plant supported by the frame;
   a drive system associated with the power plant, the drive system being adapted to rotate a diamond impregnated saw blade; and
   a control system comprising:
      a first sensor adapted to measure a first operational parameter of the concrete saw that correlates to a rotational speed value of the saw blade and to generate a first output signal representative of the rotational speed value for the saw blade;
      a second sensor adapted to measure a second operational parameter of the concrete saw that correlates to a cutting depth of the saw blade and to generate a second output signal representative of the cutting depth of the saw blade;
      a third sensor adapted to measure a third operational parameter of the concrete saw that correlates to a forward motion speed of the concrete saw and to generate a third output signal representative of the forward motion speed of the concrete saw;
      a user input/output interface comprising a display screen and a keypad, the user input/output interface being adapted to prompt an operator of the concrete saw to enter:
         a predetermined maximum forward motion speed for the concrete saw;
         a predetermined minimum rotational speed value of the saw blade;
         a predetermined maximum rotational speed value of the saw blade; and
         a predetermined depth of cut value;
      a controller that is adapted to receive the first output signal from the first sensor, the second output signal from the second sensor, the third output signal from the third sensor and the predetermined maximum forward motion speed, the predetermined minimum rotational speed value, the predetermined maximum rotational speed value and the predetermined depth of cut value from the user input/output interface and to generate a controller output signal to the prime mover that controls the forward motion speed of the concrete saw during the cutting or scoring operation; and
      a memory device for storing data and software used in conjunction with the controller;
   wherein the controller output signal is generated by the controller during the cutting or scoring operation using a closed loop process comprising:
      a first step in which the controller determines the forward motion speed of the concrete saw based on the third output signal received from the third sensor;
      a second step in which the controller determines whether the forward motion speed of the concrete saw determined in the first step exceeds the predetermined maximum forward motion speed for the concrete saw;
      a third step in which the controller determines the rotational speed value for the saw blade based on the first input signal received from the first sensor;
      a fourth step in which the controller determines whether the rotational speed value for the saw blade determined in the third step is equal to or greater than the predetermined maximum rotational speed value of the saw blade;
      a fifth step in which the controller determines whether the rotational speed value for the saw blade determined in the third step is equal to or less than the predetermined minimum rotational speed value of the saw blade;
      a sixth step in which the controller determines the cutting depth of the saw blade based on the second input signal received from the second sensor; and
      a seventh step in which the controller determines whether the cutting depth of the saw blade determined in the sixth step is less than the predetermined depth of cut value;
   wherein the second step is performed after the first step;
   wherein if the forward motion speed determined in the first step is determined in the second step to exceed the predetermined maximum forward motion speed, then the controller output signal sent by the controller causes the prime mover to decrease the forward motion speed of the concrete saw and the closed loop process returns to the first step;
   wherein if the forward motion speed determined in the first step is determined in the second step not to exceed the predetermined maximum forward motion speed, then the closed loop process proceeds to the third step;
   wherein the fourth step is performed after the third step;

wherein if the rotational speed value determined in the third step is determined to be equal to or greater than the predetermined maximum rotational speed value in the fourth step, then the controller output signal sent by the controller causes the prime mover to increase the forward motion speed of the concrete saw and the closed loop process returns to the first step;

wherein if the rotational speed value determined in the third step is determined not to be equal to or greater than the predetermined maximum rotational speed value in the fourth step, then the closed loop process proceeds to the fifth step;

wherein if the rotational speed value determined in the third step is determined to be equal to or less than the predetermined minimum rotational speed value in the fifth step, then the controller output signal sent by the controller causes the prime mover to decrease the forward motion speed of the concrete saw and the closed loop process returns to the first step;

wherein if the rotational speed value determined in the third step is determined not to be equal to or less than the predetermined minimum rotational speed value in the fifth step, then the closed loop process proceeds to the sixth step;

wherein the seventh step is performed after the sixth step;

wherein if the cutting depth of the saw blade determined in the sixth step is determined to be less than the predetermined depth of cut value in the seventh step, then the controller output signal sent by the controller causes the prime mover to decrease the forward motion speed of the concrete saw and the closed loop process returns to the first step; and wherein if the cutting depth of the saw blade determined in the sixth step is determined not to be less than the predetermined depth of cut value in the seventh step, then the controller output signal sent by the controller causes the prime mover to maintain the forward motion speed of the concrete saw and the closed loop process returns to the first step.

2. The self-propelled concrete saw according to claim 1 wherein the power plant is an internal combustion engine.

3. The self-propelled concrete saw according to claim 1 wherein the power plant is an electric motor.

4. The self-propelled concrete saw according to claim 1 wherein the saw blade rotates in the same direction as the front wheels rotate when the self-propelled concrete saw moves in the forward direction.

5. The self-propelled concrete saw according to claim 2 wherein the first sensor is an electronic load control module or a tachometer mounted on the internal combustion engine.

6. The self-propelled concrete saw according to claim 1 wherein the first sensor is a digital RPM sensor for measuring the actual rotational speed of the saw blade.

7. The self-propelled concrete saw according to claim 1 wherein the third sensor is a rotary transducer mounted to one of the front wheels.

* * * * *